J. Campbell,'s,
Corn-Planter & Cultivator.

N° 93,172.  Patented Aug. 3. 1869.

Witnesses:
E. A. Clarkson,
Fred. Thomas,

Inventor:
John Campbell,

Sheet 2. 2 Sheets.

J. Campbell's
Corn-Planter & Cultivator.

Nº 93,172. Patented Aug. 3. 1869.

Witnesses:
E. A. Clarkson.
Fred. Thomas.

Inventor:
John Campbell.

United States Patent Office.

JOHN CAMPBELL, OF LONDON, OHIO.

Letters Patent No. 93,172, dated August 3, 1869.

IMPROVEMENT IN COMBINED CORN-PLANTER AND CULTIVATOR

The Schedule referred to in these Letters Patent and making part of the same.

*To all whom it may concern:*

Be it known that I, JOHN CAMPBELL, of London, in the county of Madison, and State of Ohio, have invented a new and improved Combined Corn-Planter and Cultivator; and I do hereby declare that the following is a full and exact description of the same, reference being had to the accompanying drawings, and to the letters of reference marked thereon.

This invention relates to a combined corn-planter and cultivator; and

It consists mainly, first, in certain peculiar devices for operating the shovels, and second, in certain devices for planting the corn.

It further consists, also, in the general combination and arrangement of the various parts.

The details of construction and manner of operation will be fully described hereinafter.

In the drawings—

Figure 1:
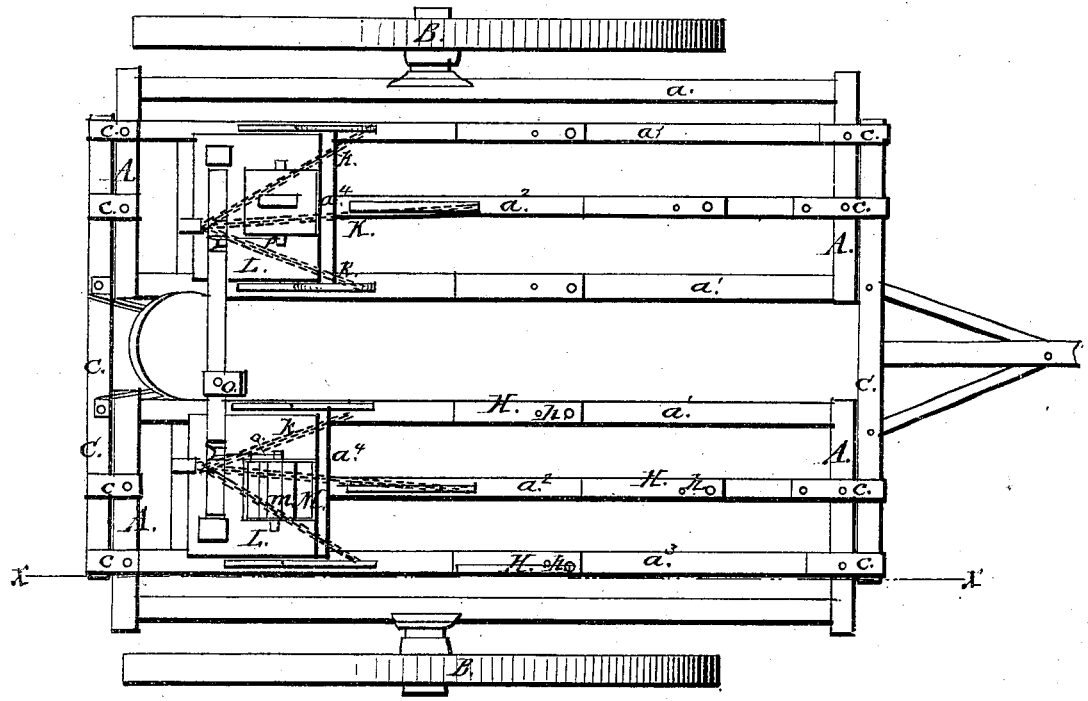
Figure 1 is a plan view, as arranged to operate as a corn-planter.
Figure 2:
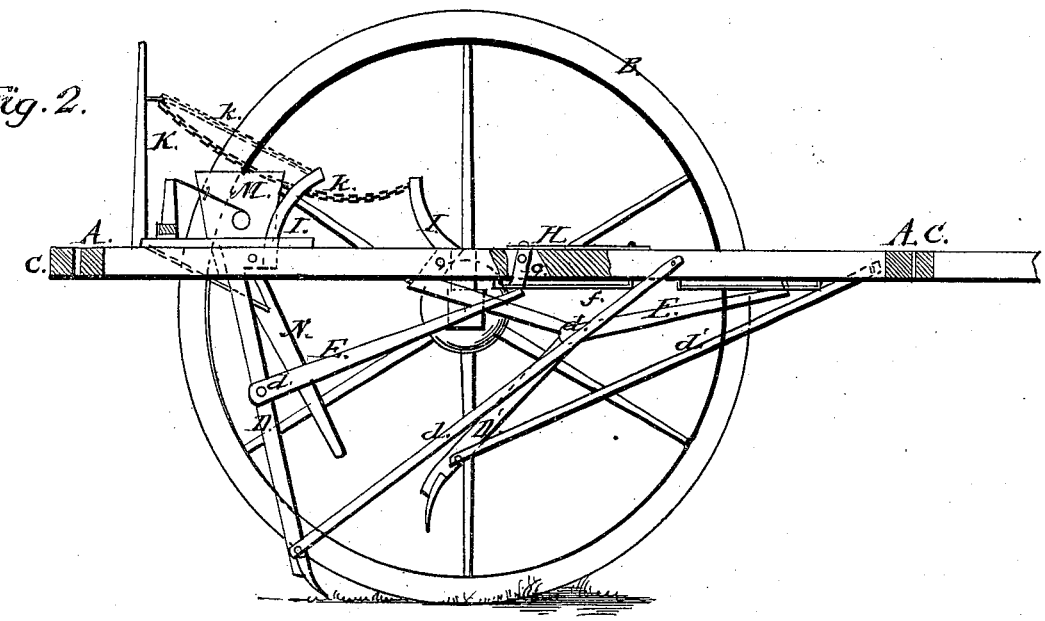
Figure 2 is a sectional elevation through the line $x\ x$, fig. 1.
Figure 3:
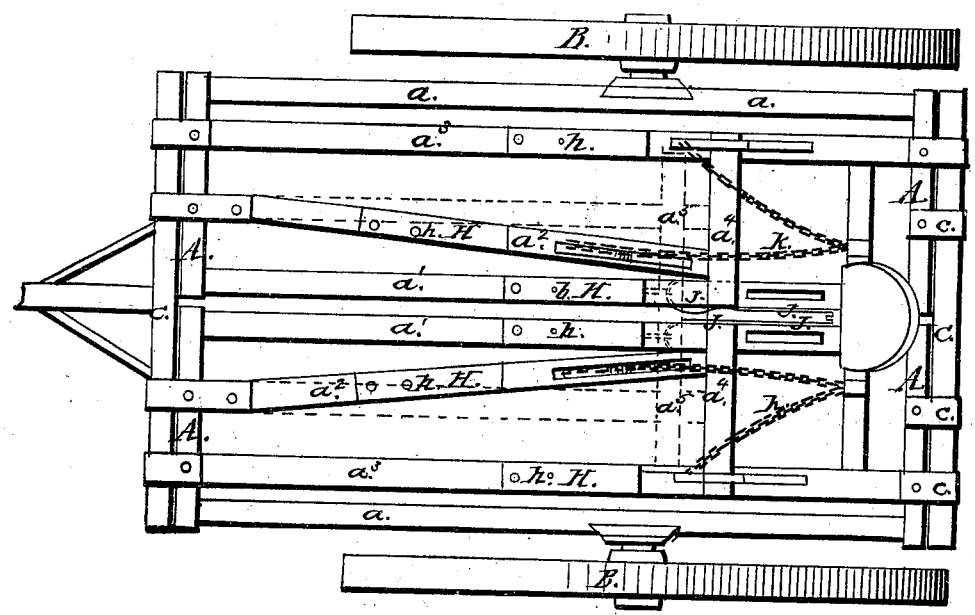
Figure 3 is a plan view, arranged to operate as a cultivator.
Figure 4:
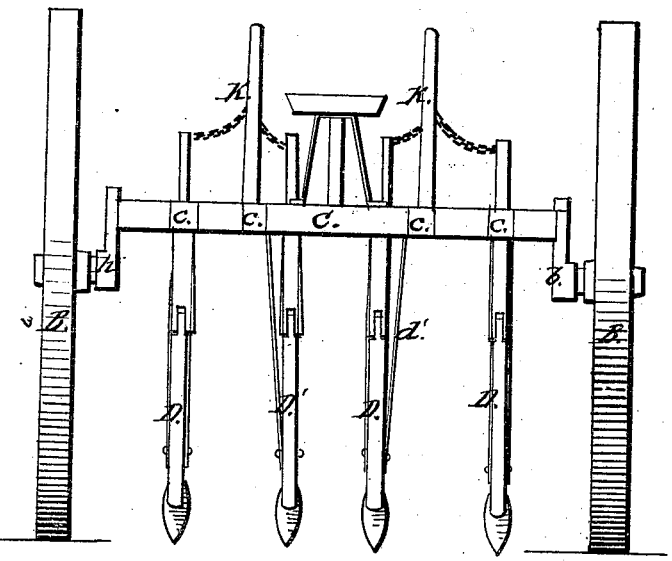

Figure 4, a rear elevation of the same.

To enable others skilled in the art to make and use my invention, I will now proceed to describe fully its construction and operation.

A A represent the frame of the machine, which is constructed in two similar parts, as shown.

B B represent the wheels upon which the machine rests.

The axles of these wheels are supported in short standards $b\ b$, which latter are so connected to the frame A A as to permit vertical adjustment.

The two parts of the frame are united in front and rear by means of the cross-bars C, the union being effected by means of sockets $c$, as shown.

Each part A of the frame consists of the side bar $a$ and shovel-beams $a^1\ a^2\ a^3$.

It will be observed that the beam $a^2$ is somewhat shorter than the others, and that its rear end is confined by means of the cross-bars $a^4\ a^4$.

Each special shovel-beam is similarly provided with shovels, those upon the beams $a^2$, however, being in advance of the others, as shown.

The devices for operating the shovels are alike in each, and will now be described.

D D' represent the shovel-standard, which is hinged as shown at $d$.

$d'\ d'$ represent rigid braces, extending from near the lower end of the shovel-standard to a point near the front end of the beam. These braces are pivoted at each end, so as to permit a swinging movement when necessary.

E also represents a brace, the rear end of which unites with the standard D D' at the point where the two parts are hinged.

Its front end is held by means of a rod, $f$, which is located beneath the shovel-beam, as is shown in the drawings, and passes through a suitable hole in the upper end of the brace E.

This arrangement permits the latter to have a sliding movement upon the rod.

In order, however, that the standard may be rendered rigid when at work, the beam is provided with a catch, $g$, located in a suitable slot thereon, the lower end of which is provided with a suitable notch, in which the upper end of the brace E rests. This catch $g$ is pivoted in such manner that when its lower end is moved forward, the end of the brace E is disengaged therefrom.

To hold the catch in place, I provide the spring H, one end of which is securely fixed to the top of the shovel-beam over the slot, but the other end is free.

For the purpose of regulating this spring, I provide the regulating-screw $h$, by means of which it may be caused to press with greater or less force upon the upper end of the catch $g$, which slightly projects above the beam.

By this construction and arrangement, the shovel-beam is rigidly held, excepting when an obstruction is met with, in which case the increased pressure forces up the spring, moves forward the catch, and thus freeing the upper end of the brace E, permits the shovel to move backward and upward by the shutting together of the standard.

To raise the shovels when necessary, I attach to the upper ends of the standard the elbow-levers I, which may be operated singly, if desired, or being connected by chains to a single lever, K, may be all operated together, as shown.

When it is desired to use my machine for cultivating-purposes, the shovels, and their attachments upon the beams $a^3$, are removed, and the beams $a^2$ are connected, at their rear ends, by means of a removable cross-bar, $a^5$.

When thus arranged, it will be seen that the machine forms a double-shovel cultivator.

In order to provide for moving the inner shovels, in case the rows should be crooked, I attach cords $j$ to the inner sides of the beams $a^2$, which, running through any suitable holding-device, are connected to the lower ends of the foot-levers J J.

As these beams are provided, at their front ends, with swinging joints, it is only necessary to properly operate the levers to swing the shovels to either side.

When used for this purpose, the frames are moved together, so that the shovels occupy the proper relation to a row of corn.

When it is desired to use the machine for planting-purposes, the parts A A of the frame are separated, and fastened by bolts, the bar $a^5$, connecting the beams $a$, having been removed, and the beams $a^2$ having been also secured rigidly in place by means of bolts. The chains $k$ then being unhooked from the levers K, the planting-devices are put in place. These consist of a board or frame, L, which rests upon the main frame in a suitable position, as shown; a hopper, M, and delivery-tube, N.

The hopper is provided with a cylinder, $m$, having a seed-cell of suitable size thereon, which is given a half revolution by means of a foot-lever, O, which is connected to the cylinder by means of a cord, $o$.

To effect the return of this cylinder to place, I attach, at its other end, a cord, $p$, which is again attached below to a spring, $p'$.

To prevent the grain from being crushed by the movement of the cylinder, I provide, within the hopper, a brush, $n$, which sweeps off all surplus grain from the cell as the cylinder revolves.

In using the machine for planting, it is first driven across the field with all the shovels raised, excepting those attached to the beams $a^2$. By this operation the field is properly marked. The machine is then driven across these furrows, with all the shovels down, the rider operating, at the same time, with his foot, the lever O, each time the wheel strikes a furrow. By this operation the corn is planted at regular intervals.

It will be observed that the shovel upon the beams $a^2$ operates to open the ground, while the others serve to cover the corn.

By the construction and arrangement herein described, an exceedingly desirable machine is obtained, which serves the double purpose of planting and cultivating corn, the changes from one to the other being easily and quickly made.

Having thus fully described my invention,

What I claim as new, and desire to secure by Letters Patent, is—

1. The shovel-standards D D', rigid braces $d'$ $d'$, and sliding brace E, when combined substantially as and for the purpose described.

2. The brace E, with its connections, when combined with the rod $f$ and catch $g$, substantially as and for the purpose described.

3. The catch $g$, when combined with the brace E and spring H, as and for the purpose set forth.

4. The spring H, provided with the regulating-screw $h$, as and for the purpose described.

5. The standards D D', constructed as described, when combined with the levers I, as and for the purpose set forth.

6. The standards D D', constructed as described, when combined with the levers I, chains $k$, and lever K, as and for the purpose set forth.

7. The seed-planting device, consisting of the frame L, hopper M, tube N, cylinder $m$, cords $o$ $p$, spring $p'$, and foot-lever O, the whole being combined as described.

8. The arrangement of the beam $a^2$ and bars $a^5$, in connection with the cords $j$ and foot-levers J J, as and for the purpose described.

9. The arrangement of the parts A A and cross-bars C C, as and for the purpose described.

10. The machine described, consisting of the frame A A, planting-devices L M N $m$ $o$ O, and shovel-devices D D', $d'$ $d'$, E $f$ $g$ H, when combined as described, for the purpose set forth.

This specification signed and witnessed, this day of        1869.

JOHN⁺ CAMPBELL.

Witnesses:
S. J. NOYES,
E. A. CLARKSON.